United States Patent [19]

DeLorenzo et al.

[11] 4,019,182
[45] Apr. 19, 1977

[54] RADAR SIGNAL PROCESSOR

[75] Inventors: Joseph DeLorenzo, Sudbury, Mass.; Julius V. DiFranco, Dix Hills; Frank J. Scire, Huntington Staton, both of N.Y.

[73] Assignee: The United States of America as represented by the Secretary of the Army, Washington, D.C.

[22] Filed: Mar. 14, 1973

[21] Appl. No.: 342,906

[52] U.S. Cl. .............................. 343/7 A; 343/5 DP; 343/17.1 R

[51] Int. Cl.² ........................................... G01S 7/34

[58] Field of Search ....... 340/6 R; 343/7 A, 17.1 R, 343/5 DP, 16 M

[56] References Cited

UNITED STATES PATENTS

| 3,380,018 | 4/1968 | Littrell et al. | 343/7 A |
|---|---|---|---|
| 3,505,637 | 4/1970 | Abruzzo | 343/7 A |
| 3,582,872 | 6/1971 | Prager | 340/6 R |
| 3,701,149 | 10/1972 | Patton et al. | 343/5 DP |

*Primary Examiner*—Richard A. Farley
*Assistant Examiner*—Richard E. Berger
*Attorney, Agent, or Firm*—William G. Gapcynski; Lawrence A. Neureither; Robert C. Sims

[57] ABSTRACT

Input videos from a multiple beam radar system are processed beam by beam by first threshold devices which are weighted in accordance with signals from all the beams, and then the signal has to pass one of two further threshold devices before being processed as a target indication. One of the additional threshold devices is biased by all adjacent beams of the beam being processed; and the other threshold device is biased by weighted factors of the adjacent beams. The weight being dependent upon whether the beam is a near adjacent beam or a diagonally adjacent beam.

3 Claims, 2 Drawing Figures

RADAR SIGNAL PROCESSOR

SUMMARY OF THE INVENTION

The present invention is a processor for a multiple beam radar usable in a multiple target environment. The video input from each beam must pass through a first threshold device to determine whether it is large enough to exceed a predetermined level associated with the general side lobe and clutter level in all beams. This is accomplished by summing all the beams to yield a signal sum average value and passing this average through a weight circuit to the threshold circuit. In this manner noise will be eliminated as a false alarm target.

A signal which exceeds this first threshold level is next examined to see whether it is greater than all of the adjacent beams thereto by a second threshold device. If the beam is greater in magnitude than all adjacent beams then the signal is considered a target and precedes out of the processor to utilization circuits as a target signal. The second threshold device is biased by a greater of circuit which has as its inputs the signals from all the beams adjacent to the beam being processed. —

If the signal does not exceed the threshold level of the second threshold circuit, it is subject to an additional test. If the signal does not pass the threshold of the second threshold circuit, then a beam adjacent to it contains a signal greater than the beam being processed. The signal from that other beam will cause signals in all beams adjacent to it. For example it can be assumed that the signal strengths in the near adjacent beams are 10 db below the actual peak signal, and those diagonally adjacent the beams are 23 db below the peak. The function of the third threshold circuit is to determine if the signal in the beam being processed exceeds the −10 db or −23 db expected values due to its position in relation to the stronger signal. If the beam being processed does exceed these test values, it will be treated as a detection and transmitted as a target signal output. This test is accomplished by finding the greatest of the signals from the adjacent beams weighted by the −10 db if a near adjacent beam or the −23 db if a diagonally adjacent beam. The signals are passed through a greater of circuit to bias the third threshold circuit.

The amplitude of the signal is maintained throughout all the threshold circuits. If it exceeds the threshold, then it is transmitted unattenuated as a processor output. The outputs the threshold devices are further fed to the apropriate greater of circuits and the other beams being processed.

DESCRIPTION OF THE PREFERRED EMBODIMENT

Figure 1:
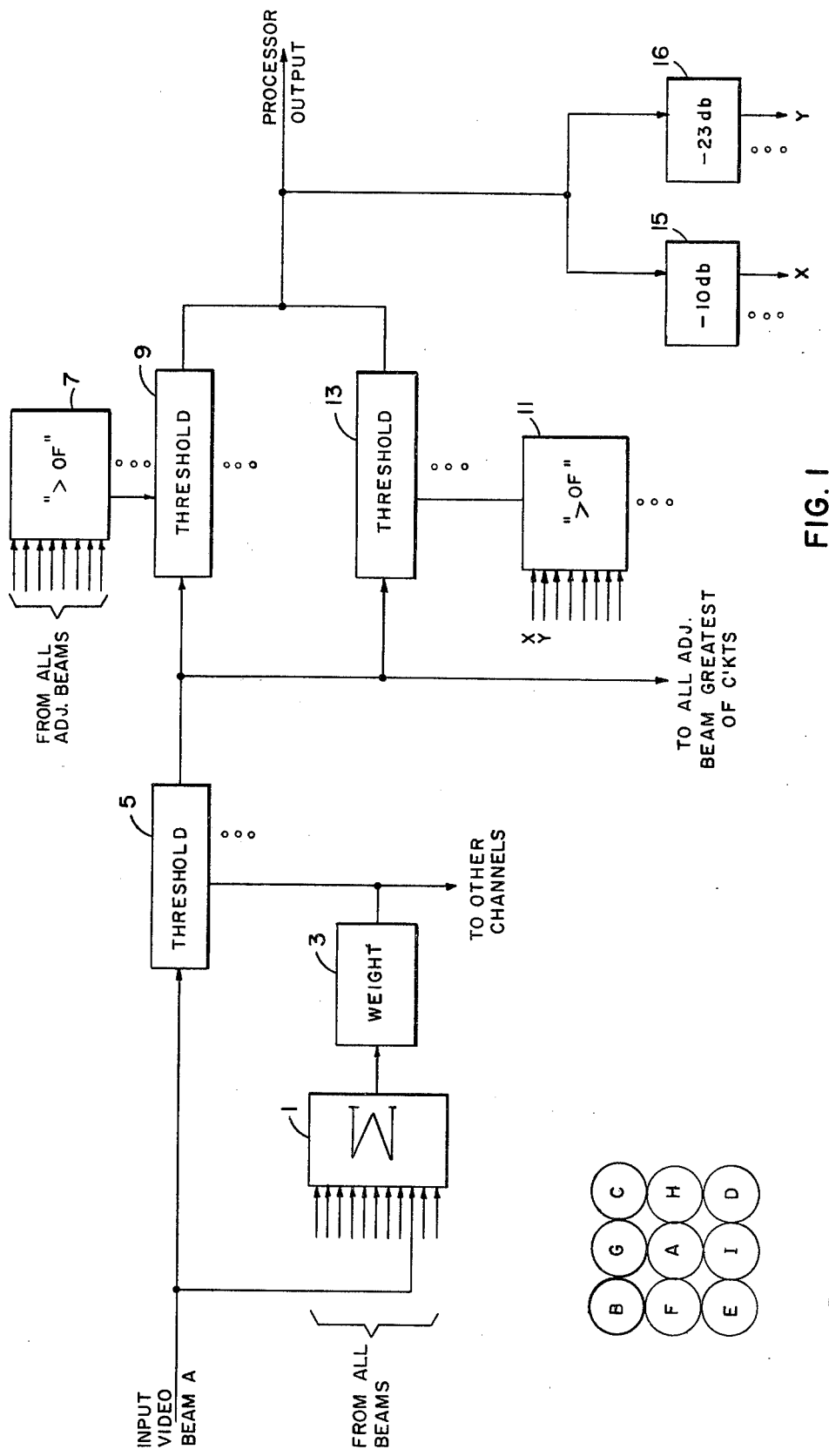
FIG. 1 is a block diagram showing the preferred embodiment of the invention.
Figure 2:
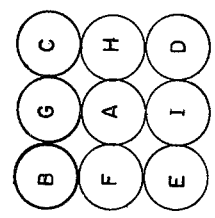
FIG. 2 is a diagrammatic showing of the relative positions of the beams.

This invention is incorporated in a radar system for affording false alarm reduction in a discrimination multiple beam type radar. The radar is of the well known type which produces individual beams physically located relative to each other in a rank and file pattern. FIG. 2 shows the relationship of one beam A to its adjacent beams B-I. A typical radar system will consist of 36 such beams. In FIG. 1 the video output of all of the beams are fed to a summing circuit 1 the summing circuit 1 will yield a signal that represents some average signal of all the input beam video signals. Any of the well known summing circuits may be used. A weight circuit 3 is a network divider circuit which yields a predetermined percentage of the output signal from 1 and feeds it to threshold circuit 5. Threshold circuit 5 is duplicated 36 times for each individual beam video input. The output of weight circuit 3 is fed to all these threshold circuits. The input video from a particular beam A is fed to threshold device 1 as shown by FIG. 1 while input from other particular beams B-I are fed to the other threshold devices not shown.

The threshold device 5 will compare the input video beam signal A with the average and weighted signal from 3. If the video signal is of a certain threshold compared to the average signal, the signal input video will be passed in its entirity to the output of the threshold circuit. If the threshold level is not met, the signal will be blocked. In this way noise signals in the beams are eliminated and prevented from causing false alarms. Any of the well known threshold devices may be used in which the amplitude of the input signal is maintained through the threshold circuit if it is of a greater value than the threshold value.

The video signal which exceeds the threshold level of circuit 5 is considered to be caused by returns other than noise. However, the signal in this particular beam may have been caused by a target return in a beam nearby. If this is the case, then the video signal should not be reported as a target return. A good test to determine whether that detector beam is the target return beam is to compare the amplitude value of that beam with all the beams adjacent to it. If the beam is greater than all of the beams adjacent to it then that beam is considered a "local maximum" and should be processed as a target return.

This is accomplished by the "greater of" circuit 7 and the threshold circuit 9. The signals going in to the greater of circuit 7 are those from all 8 adjacent beams (the outputs from beams B-I). These input signals to circuit 7 are derived from the outputs of the appropriate duplicate threshold circuits 5 not shown. The output of circuit 7 will set the threshold level of threshold circuit 9. If the beam signal exceeds the threshold of 9, then it is a local maximum and will be accepted as a target detection and sent to the processor output video, not shown.

Circuit 7 can be made up of a number of diodes whose anodes are connected to the separate inputs from all the adjacent beams and whose cathodes are connected together forming the output. The largest adjacent beam voltage will forward bias its associated diode and reverse bias all the remaining diodes. This will place the signal of the greatest adjacent beam voltage on the output of circuit 7.

In a single target environment or an environment in which the targets are widely separated, the circuit described so far will detect all the target return without any false returns. However, if there were both a large target return on one beam and a smaller target return which shares a common adjacent beam (or is adjacent thereto), then the smaller return might not pass as a local maximum. This is due to the fact that the large target return in one beam induces a signal in adjacent beams. In the near adjacent beams it will cause a return which is −10 db of the beam signal, and in the diagonally adjacent beams the signal will be −23 db of the signal. Therefore, if any beam adjacent to a target return has a signal which is greater than the expected decibel decrease, then that beam must be considered a small target return.

In order to implement this in circuit form, a further greater of circuit 11 and a further threshold circuit 13 are provided. The input to circuit 11 is provided from the output of any adjacent beam which is being sent to the processor output video. However, these signals are attenuated by attenuators 15 and 16. The output of these two attenuators are designated as X and Y. The circuits 5, 7, 9, 11, 13, 15, and 16 are all duplicated to accommodate the 36 beams. The X outputs are all fed to the greater of circuit 11 which is in a beam that is near adjacent to the beam output of the particular circuit 15. The Y output is fed to the appropriate greater of circuits 11 for the beams in which it is the diagonally adjacent beam.

Greater of circuit 11 is constructed within the same manner as circuit 7 aand produces an output to set the threshold level of threshold circuit 13. If the video signal input to threshold 13 is greater than this level then the beam signal is larger than it should be and is sent as a target return output.

We claim:

1. A processor in a multiple beam radar system having a plurality of beam signals physically located to each other in a rank and file pattern comprising a first threshold circuit having an input and an output; a first beam signal being fed to the input of the threshold circuit; a first means connected to said threshold circuit for setting the threshold level in accordance with a weighted amount of the average of all the beam signals; a second threshold circuit having an input and an output; the input of said second threshold circuit being connected to the output of said first threshold circuit; a first greater of circuit having a plurality of inputs and an output; each beam signal physically adjacent to said first beam signal being connected to individual ones of the inputs to said greater of circuit; and said first greater of circuit being connected to said second threshold circuit so as to set the threshold level thereof.

2. A processor as set forth in claim 1 further comprising a third threshold circuit having an input and an output connected in parallel with the input and the output of said second threshold circuit; a second greater of circuit having a plurality of inputs and an output; first and second sets of attenuators; said beam signals being located with respect to each other such that four beam signals are near adjacent, and four beam signals are diagonally adjacent to a given beam signal; said first set of attenuators being connected between near adjacent beam signals of said first beam signal and half of the inputs of said second greater of circuit; said second set of attenuators beng connected between diagonally adjacent beam signals with respect to said first beam signal and the other inputs of said second greater of circuit; and the output of said second greater of circuit being connected to said third threshold circuit so as to set the threshold level thereof.

3. A processor as set forth in claim 2 further comprising additional first, second and third threshold circuits, first and second greater of circuits and first and second sets of attenuators for each beam signal all connected in the same manner as such circuits were connected to said first beam signal; the input from said first greater of circuit being derived from the output of the first threshold circuits; said first and second sets of attenuators being individually connected in first and second pairs to the output of said second threshold circuit; and the input for said second greater of circuit being derived from the output of these attenuators.

* * * * *